(12) United States Patent
Nelson et al.

(10) Patent No.: US 8,219,256 B2
(45) Date of Patent: Jul. 10, 2012

(54) BANG-BANG CONTROLLER AND CONTROL METHOD FOR VARIABLE SPEED WIND TURBINES DURING ABNORMAL FREQUENCY CONDITIONS

(75) Inventors: Robert J. Nelson, Orlando, FL (US); John D. Amos, Oviedo, FL (US); Hongtao Ma, Orlando, FL (US)

(73) Assignee: Siemens Aktiengesellschaft, München ( * ) Notice: Subject to any disclaimer, the term of this patent is extended or adjusted under 35 U.S.C. 154(b) by 414 days.

(21) Appl. No.: 12/502,295

(22) Filed: Jul. 14, 2009

(65) Prior Publication Data

US 2011/0012352 A1    Jan. 20, 2011

(51) Int. Cl.
*F03D 9/00* (2006.01)
(52) U.S. Cl. .................. 700/287; 290/44; 290/55
(58) Field of Classification Search .......... 700/287; 290/44, 55
See application file for complete search history.

(56) References Cited

U.S. PATENT DOCUMENTS

| | | | |
|---|---|---|---|
| 5,083,039 A | 1/1992 | Richardson | |
| 5,225,712 A | 7/1993 | Erdman | |
| 7,345,373 B2 | 3/2008 | Delmerico | |
| 7,372,173 B2 | 5/2008 | Lutze et al. | |
| 7,728,451 B2 * | 6/2010 | Ichinose et al. | 290/44 |
| 7,800,243 B2 * | 9/2010 | Bendixen et al. | 290/44 |
| 2005/0077881 A1 | 4/2005 | Capp et al. | |
| 2008/0088131 A1 | 4/2008 | Thisted | |
| 2009/0326724 A1 * | 12/2009 | Lasseter et al. | 700/287 |
| 2010/0138070 A1 * | 6/2010 | Beaudoin | 700/297 |
| 2010/0308585 A1 * | 12/2010 | Jorgensen et al. | 290/44 |

FOREIGN PATENT DOCUMENTS

| | | |
|---|---|---|
| EP | 1467463 A1 | 10/2004 |
| EP | 1790850 A1 | 5/2007 |
| EP | 1914420 A1 | 4/2008 |
| WO | WO 03/023224 A1 | 3/2003 |
| WO | 2006030183 A1 | 3/2006 |

OTHER PUBLICATIONS

Lalor, G., Mullane, A., O'Malley M. "Frequency Control and Wind Turbine Technologies". IEEE Transactions on Power Systems 20.4 (2005): 1905-1913.*
"Frequency Regulation Contribution Through Variable-Speed Wind Energy Conversion Systems"; Juan Manuel Mauricio, Marano, Gomez-Exposito and Martinez Ramos; IEEE Transactions on Power Systems, vol. 24, No. 1, Feb. 2009.
"A Primer on Wind Power for Utility Applications"; Y. Wan; NREL National Renewable Energy Laboratory; Technical Report NREL/TP-500-36230; Dec. 2005.

* cited by examiner

*Primary Examiner* — Ryan Jarrett

(57) ABSTRACT

A wind farm (10) may include a plurality of variable speed wind turbines (12, 14, 16). A centralized controller (50) may be configured to selectively adjust a respective electrical output power from each of the wind turbines at least during an underfrequency condition. The controller may include a monitor (52) configured to monitor a grid frequency value relative to at least a first threshold value. A deviation of the grid frequency value beyond the first threshold value is indicative of the underfrequency condition. The controller further includes a control unit (54) configured to effect a step response to the electrical output power of the wind turbine in a direction selected to counteract the underfrequency condition.

25 Claims, 2 Drawing Sheets

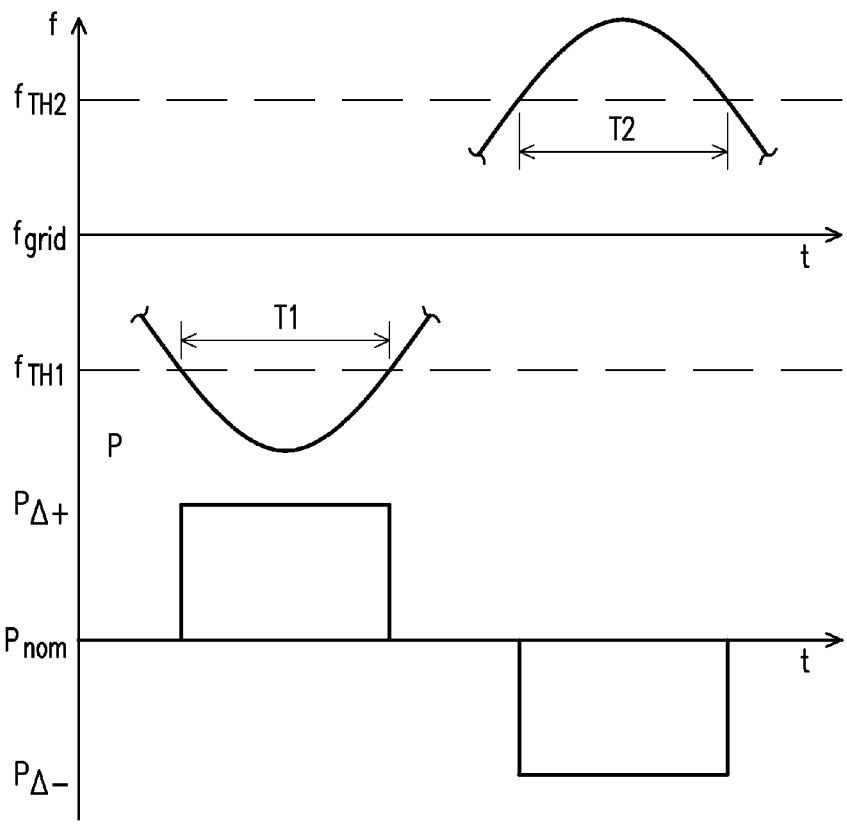
FIG. 2
FIG. 3
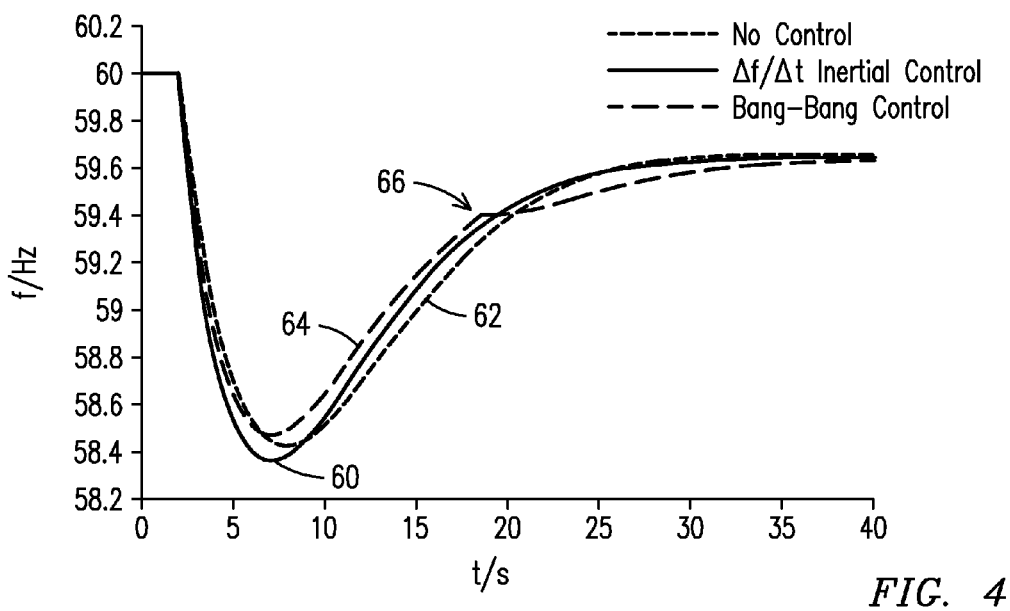
FIG. 4

BANG-BANG CONTROLLER AND CONTROL METHOD FOR VARIABLE SPEED WIND TURBINES DURING ABNORMAL FREQUENCY CONDITIONS

FIELD OF THE INVENTION

The present invention is generally related to wind turbines, and, more particularly, to a wind turbine controller and/or control techniques conducive to improvements in connection with frequency regulation of variable speed wind turbines.

BACKGROUND OF THE INVENTION

Wind-driven electric power generation is non-polluting and is thus considered to be environmentally friendly. This form of power generation is further desirable in view of the utilization of a renewable source of energy, the wind. A commonly cited concern of power system operators is that wind turbines that use electronic interfaces, such as doubly-fed induction generators or generators with a full converter interface, do not respond to correct abnormal frequency (e.g., underfrequency) conditions as do directly connected machines. For example, during system frequency reductions, directly connected machines in a self-acting manner can convert a portion of a shaft kinetic energy to supplemental electric power.

Directly connected generator machines contribute to frequency and/or voltage regulation by producing an electromagnetic torque that opposes any change in rotational speed and the torque is proportional to the product of the inertia and the rate of change of the shaft rotational speed. This incremental torque (and incremental electric power) is commonly referred as the "inertial response" of the machine to a change in system frequency.

Wind turbines that have electronic interfaces to a power grid are inherently insensitive to frequency changes and do not produce any response to frequency changes unless they are programmed to do so. One approach is described in PCT application No. WO 03/023224 A1, filed on 20 Mar. 2003, titled "System For Using Energy Stored In The Mechanical Inertia Of The Rotor Of A Wind Turbine", which describes a system for using turbine mechanical inertia for dynamic stability and frequency control. The system purportedly uses a fixed frequency reference and the derivative of frequency ($\Delta f/\Delta t$) to calculate a supplemental torque and power output of the system. Derivative terms in control systems are generally subject to noise that can affect performance. Additionally, a fixed reference may lead to difficulties where the turbine control is desired to track the normal fluctuations in utility frequency without undue supplemental torque or power interactions. Another approach is described by U.S. Pat. No. 7,345,373, titled "System And Method For Utility And Wind Turbine Control, filed Nov. 29, 2005. The approach described in this US patent requires burdensome computation of an internal reference frame and a determination of a concomitant frequency of rotation $\omega_i$ for the internal reference frame and further requires that the supplemental power signal be modified as a function of the internal reference frame and the measured frequency to purportedly reduce the effects of noise that would result from using a derivative signal of the inertial response, as proposed by the above-cited PCT application.

Therefore, there is a need to overcome the above-mentioned issues and to provide apparatus and/or control techniques conducive to improvements in connection with frequency regulation of wind turbines.

BRIEF DESCRIPTION OF THE DRAWINGS

The invention is explained in the following description in view of the drawings that show:

FIG. 2 is a plot of example abnormal frequency conditions as may occur in a wind turbine.

FIG. 3 is a plot of an example stepped response of the electrical output power of the wind turbine in respective directions selected to counteract the abnormal frequency conditions illustrated in FIG. 2.

FIG. 4 is a graph that should be helpful to compare an example operational performance of a bang-bang controller in accordance with aspects of the present invention relative to the operational performance of other known implementations.

DETAILED DESCRIPTION OF THE INVENTION

Figure 1:
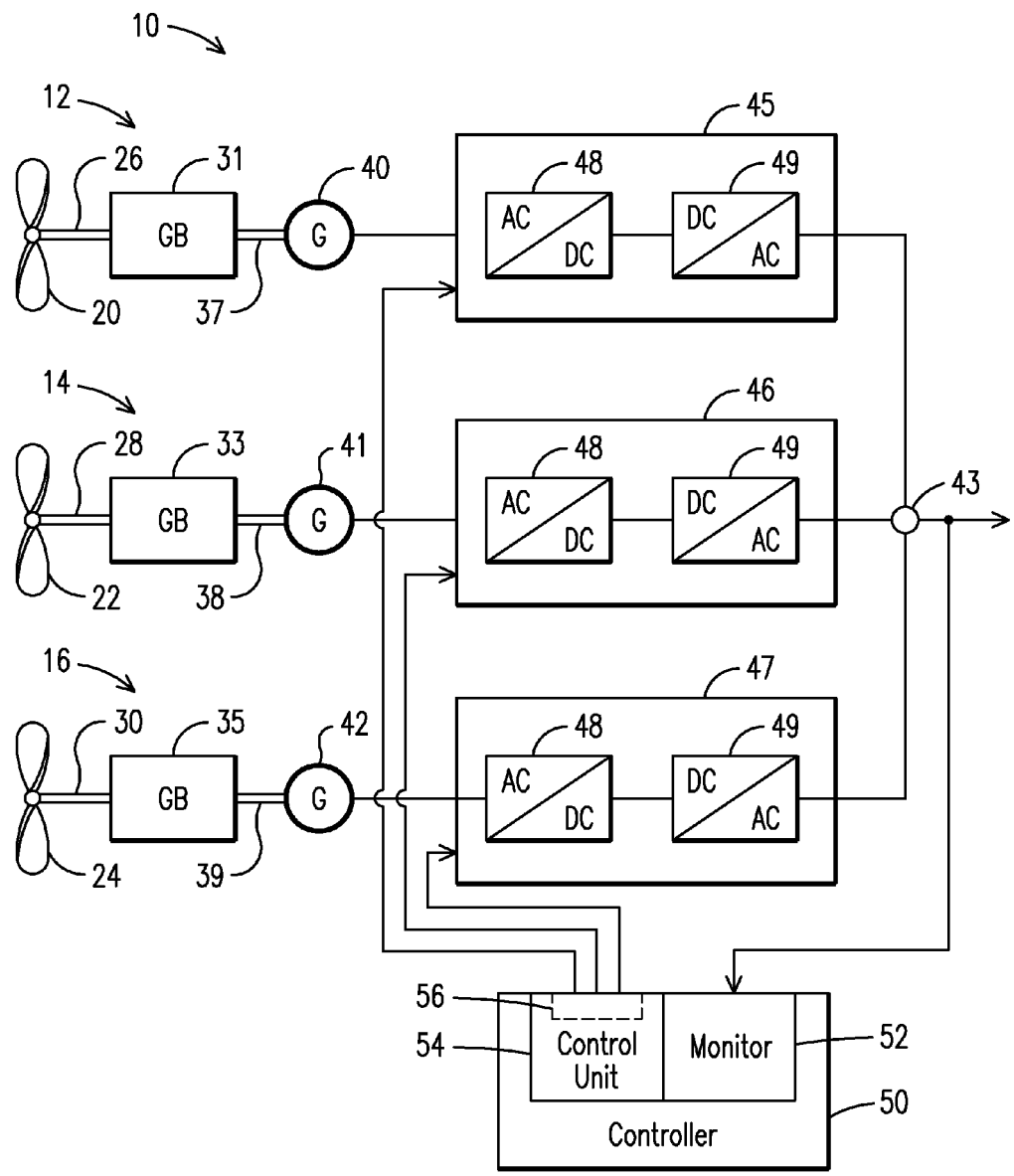
FIG. 1 is a schematic of an example embodiment of a power generation system, (e.g., a wind farm) that can benefit from aspects of the present invention.

In accordance with one or more embodiments of the present invention, structural arrangements and/or techniques conducive to improve the operational performance of wind-driven power generation systems during abnormal frequency conditions (e.g., underfrequency conditions), are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

FIG. 1 is a schematic of an example embodiment of a power generation system, such as a wind farm 10 that may benefit from aspects of the present invention. In this example embodiment, wind farm 10 comprises three wind turbine systems 12, 14, 16 (hereinafter referred to as wind turbines) which are coupled to respective generators and associated power converting electronics in an example interconnecting arrangement. It will be appreciated that the number of wind turbines is not limited in any way to three wind turbines. Additionally, aspects of the present invention are not limited to the specific example interconnecting arrangement shown in FIG. 1 being that other kinds of interconnecting arrangements are possible for the wind turbines.

Each wind turbine 12, 14, 16 comprises a respective rotor 20, 22, 24 with a rotor shaft 26, 28, 30 transmitting the torque of a turning rotor 20, 22, 24 to a respective gear box (GB) 31,

33, 35. The gear boxes (GB) 31, 33, 35 are arranged to transmit rotation from rotors 20, 22, 24 to output shafts 37, 38, 39 with a certain gear ratio.

Each output shaft 37, 38, 39 is mechanically coupled to the respective rotor of an AC (alternating current) generator (G) 40, 41, 42 which respectively transforms the mechanical power provided by the rotation of the output shafts 37, 38, 39 into electrical power. The generators 40, 41, 42 are variable speed generators, i.e., the rotational speed of the respective rotors is allowed to vary, for example, depending on wind conditions.

In alternative example embodiments, the generators 40, 41, 42 may be doubly fed asynchronous generators, or direct drive generators coupled to a full converter. As will be appreciated by those skilled in the art, in a full conversion implementation, the generator stator windings (not shown) may be directly fed to the converter. In a doubly fed implementation, the generator rotor windings (not shown) are coupled to the converter and the generator stator windings (not shown) are coupled directly to the utility system.

Each wind turbine may be electrically connected to a node 43 to supply output power via respective power converter electronics 45, 46, 47 which respectively convert the variable frequency of the electrical power signals delivered by the generators 40, 41, 42 into electrical power output configured to meet a fixed grid frequency (e.g., 60 Hz in North America, 50 Hz in Europe). The respective frequencies of the power signals delivered by generators 40, 41, 42 vary depending on the respective rotational frequencies (e.g., revolutions per minute RPM) of the wind turbines rotors 20, 22, 24. However, by first rectifying (by means of respective rectifying circuits 48) the AC power delivered by generators 40, 41, 42 into DC power and then converting (by means of respective converting circuits 49) the DC power back into AC power, the respective generator variable frequencies can be converted to the grid frequency.

Wind farm 10 may further comprise a centralized controller 50 communicatively coupled to each of the wind turbines 12, 14, 16 and configured to control the respective output power from the wind turbines in accordance with aspects of the present invention. It will be appreciated that the location of centralized controller 50 may be within the wind farm or remote from the wind farm. Additionally, the coupling connection between centralized controller 50 and wind turbines 12, 14, 16 may be effected by any suitable communication link, e.g., wired or wireless communication link. It will be appreciated that the term controller as used herein, is not limited to just those integrated circuits referred to in the art as a controller, but broadly refers to a processor, a microcontroller, a microcomputer, a programmable logic controller, an application specific integrated circuit, and any other type of device that may programmed to function as a controller.

The inventors of the present invention propose innovative controller and/or control techniques configured to control variable speed wind turbines to provide a fixed increment of supplemental electric power as soon as the frequency value drops below a threshold value and continue to provide that supplemental power until the frequency is restored to an appropriate predefined value. This type of control strategy is classically referred to in the art as "bang-bang" or "on-off" control, and may be configured to provide a maximum amount of supplemental power (subject to the capabilities of a practical real-world wind turbine implementation) during underfrequency conditions to return the frequency to the predefined value as quickly as feasible. The phrase "stepped (step) response during an underfrequency (or overfrequency) condition" is used throughout this disclosure interchangeably with the classical terminology of "bang-bang" and/or "on-off" control. This approach recognizes that in a variable speed wind turbine, power could either be kept in reserve (by continuously operating within a predefined margin under the applicable power curve) or could be temporarily extracted from kinetic energy present in a rotating shaft of the wind turbine. The extracted kinetic energy may be returned once the frequency is returned to the predefined value. For readers desirous of general background information regarding bang-bang principles reference is made to subsection titled "The Form of Optimal Control For A class of Minimum Time Problems" (pp 245-247) of textbook titled "Optimal Control Theory, An Introduction" by Donald E. Kirk, © 1970 by Prentice-Hall Inc., which is herein incorporated by reference.

As described in greater detail below, controller 50 may be configured to adjust the respective electrical output power from wind turbines 12, 14, 16 during an abnormal frequency (underfrequency or overfrequency) condition. In one example embodiment, controller 50 includes a monitor 52 configured to monitor a grid frequency value relative to at least a first threshold value. For example, a deviation of the grid frequency value beyond the first threshold value may be indicative of the underfrequency condition. The controller further includes a control unit 54 configured to effect a step response to the electrical output power of the wind turbine in a direction selected to counteract the underfrequency condition, whereby kinetic energy stored in a rotating shaft of the wind turbine is extracted to effect the step response to the electrical output power of the wind turbine. The effected step response is advantageously performed by control unit 54 without evaluating at least one of the following: a rate of change of the deviation, an integral of the deviation and/or a magnitude of the deviation.

FIG. 2 is a plot of example abnormal frequency conditions as may occur in a wind turbine. For example, time interval T1 corresponds to an example underfrequency frequency condition. That is, the value of the frequency (f) is beyond a first threshold value (e.g., $f_{TH1}$). As shown in FIG. 3, during time interval T1, control unit 54 may be configured to effect a step response ($P_{A+}$) to the electrical output power of the wind turbine in a direction selected to counteract the underfrequency condition. For example, the electrical output power is stepped to value $P_{A+}$, whereby kinetic energy stored in a rotating shaft of the wind turbine is extracted to effect the step response to the electrical output power of the wind turbine. In one example embodiment, the value $P_{A+}$ may correspond to a maximum value that the wind turbine can provide subject to the constraints of a practical real-world wind turbine implementation.

Similarly, time interval T2 corresponds to an example overfrequency condition. That is, the value of frequency (f) is beyond a second threshold value (e.g., $f_{TH2}$). As shown in FIG. 3, during time interval T2, control unit 54 may be configured to effect a step response ($P_{A-}$) to the electrical output power of the wind turbine in a direction selected to counteract the overfrequency condition. For example, the electrical output power is stepped to value $P_{A-}$, whereby excess electrical energy generated during the overfrequency condition is converted to kinetic energy for storage by the rotating shaft.

FIG. 4 is a graph helpful to comparatively assess an example operational performance of a bang-bang (on-off) controller in accordance with aspects of the present invention relative to other known implementations. The graph of FIG. 4 is based on a simulation of an example scenario where a relatively large power generating component of a power system is tripped with subsequent operation of governor controls. Plot 60 illustrates example performance of a representative fossil-based system (no wind turbines), where the response is essentially based on the inertial response of the induction generators. Plot 62 illustrates example performance of a system comprising 20% wind turbines implemented with a prior art control strategy such as based on a rate of change of frequency (i.e., $\Delta f/\Delta t$). Plot 64 illustrates example performance of a system comprising 20% wind turbines implemented with a "bang-bang" control strategy in accordance with aspects of the present invention. For example, compared to prior art (e.g., $\Delta f/\Delta t$ based control), a "bang-bang" control embodying aspects of the present invention results in a relatively smaller frequency drop and a quicker recovery to an appropriate frequency value (in this example, selected to be 59.4 Hz).

It will be appreciated that in operation the "bang-bang" control (Stepped Abnormal Frequency Response) is believed to offer superior characteristics from the perspective of the power system. For example, "bang-bang" control results in minimal frequency reduction and quickest return of frequency to an appropriate frequency value. Additionally, the "bang-bang" control is conducive to a relatively uncomplicated control implementation, since it requires just relatively straightforward step changes in the output power.

Controller 50 may optionally include a droop control unit 56 (represented by the block drawn with dashed lines) configured to smooth (e.g., over region 66 in FIG. 4) the response of the electrical output power of the wind turbine as the output power returns from the underfrequency condition to a normal condition. Droop control unit 56 would be appropriate for applications where a relatively gradual transition of the power level to the normal condition may be desirable to avoid potential oscillations that could otherwise develop under a relatively sudden power output change.

In operation, aspects of the present invention provide apparatus and/or control techniques conducive to improvements in connection with frequency regulation of wind turbines. Aspects of the present invention may be met by a two-position ("bang-bang") discrete control that adjusts to maximum supplemental power change in accordance with frequency requirements.

As will be also appreciated, the above described techniques may take the form of computer or processor implemented processes and apparatuses for practicing those processes. Aspects of the present technique may also be embodied in the form of computer program code containing instructions embodied in tangible media, such as CD-ROMs, hard drives, or any other computer-readable storage medium, wherein, when the computer program code is loaded into and executed by a computer or processor, the computer becomes an apparatus for practicing the invention. The techniques described may further be embodied in the form of computer program code or signal, for example, whether stored in a storage medium, loaded into and/or executed by a computer or processor, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind farm comprising:
a plurality of variable speed wind turbines; and
a centralized controller configured to selectively adjust a respective electrical output power from each of the wind turbines at least during an underfrequency condition, the controller including a monitor configured to monitor a grid frequency value relative to at least a first threshold value, wherein a deviation of the grid frequency value beyond the first threshold value is indicative of the underfrequency condition, the controller further including a control unit configured to effect a step response to the electrical output power of the wind turbine from a baseline power level to a maximal power level in a direction selected to counteract the underfrequency condition, wherein the step response is effected by way of a singular step control function implemented by the controller from the baseline power level to the maximal power level so that kinetic energy stored in a rotating shaft of the wind turbine is instantaneously extracted to effect the step response to the electrical output power of the wind turbine.

2. The wind farm of claim 1, wherein the effected step response is performed by the control unit without evaluating at least one of the following: a rate of change of the deviation, an integral of the deviation and/or a magnitude of the deviation.

3. The wind farm of claim 1, wherein the control unit is configured to perform an on-off control strategy, wherein an on-state of the control unit effects the step response to counteract the underfrequency condition.

4. The wind farm of claim 3, wherein the on-state is maintained to reach a predefined frequency value corresponding to a normal frequency condition.

5. The wind farm of claim 3, wherein an off-state of the control unit effects a step response to the electrical output power of the wind turbine in a direction to return to a wind turbine state corresponding to a normal frequency condition.

6. The wind farm of claim 1, wherein the controller is further configured to adjust the electrical output power from the variable speed wind turbine during an overfrequency condition, wherein the control unit is configured to effect a step response of the electrical output power of the wind turbine in a direction selected to counteract the overfrequency condition, whereby excess electrical energy generated during the overfrequency condition is converted to kinetic energy for storage by the rotating shaft in view of the effected step response to the electrical output power of the wind turbine during the overfrequency condition.

7. The wind farm of claim 6, wherein the effected step response during the overfrequency condition is performed without evaluating at least one of the following: a rate of change of the deviation, an integral of the deviation and/or a magnitude of the deviation.

8. The wind farm of claim 1, wherein the controller further comprises a droop control unit configured to smooth the response of the electrical output power of the wind turbine as said output power returns from the underfrequency condition to a normal frequency condition.

9. A variable speed wind turbine comprising:
a controller coupled to the variable speed wind turbine, the controller configured to adjust an electrical output power from the wind turbine at least during an underfrequency condition, the controller including a monitor configured to monitor a grid frequency value relative to at least a first threshold value, wherein a deviation of the grid frequency value beyond the first threshold value is indicative of the underfrequency condition, the controller further including a control unit configured to effect a step response to the electrical output power of the wind turbine from a baseline power level to a maximal power value in a direction selected to counteract the underfrequency condition, wherein the step response is effected by way of a singular step control function implemented by the controller from the nominal power level to the maximal power level so that kinetic energy stored in a rotating shaft of the wind turbine is instantaneously extracted to effect the step response to the electrical output power of the wind turbine.

10. The wind turbine of claim 9, wherein the effected step response is performed by the control unit without evaluating at least one of the following: a rate of change of the deviation, an integral of the deviation and/or a magnitude of the deviation.

11. The wind turbine, of claim 9, wherein the control unit is configured to perform an on-off control strategy, wherein an on-state of the control unit effects the step response to counteract the underfrequency condition.

12. The wind turbine of claim 11, wherein the on-state is maintained to reach a predefined frequency value corresponding to a normal frequency condition.

13. The wind turbine of claim 11, wherein an off-state of the control unit effects a step response to the electrical output power of the wind turbine in a direction to return to a wind turbine state corresponding to a normal frequency condition.

14. The wind turbine of claim 9, wherein the controller is further configured to adjust the electrical output power from the variable speed wind turbine during an overfrequency condition, wherein the control unit is configured to effect a step response of the electrical output power of the wind turbine in a direction selected to counteract the overfrequency condition, whereby excess electrical energy generated during the overfrequency condition is converted to kinetic energy for storage by the rotating shaft in view of the effected step response to the electrical output power of the wind turbine during the overfrequency condition.

15. The wind turbine of claim 14, wherein the effected step response during the overfrequency condition is performed without evaluating at least one of the following: a rate of change of the deviation, an integral of the deviation and/or a magnitude of the deviation.

16. The wind turbine of claim 9, wherein the controller further comprises a droop control unit configured to smooth the response of the electrical output power of the wind turbine as said output power returns from the undefrequency condition to a normal frequency condition.

17. A method for controlling a variable speed wind turbine, the method comprising:
monitoring a grid frequency value relative to at least one threshold value, wherein a deviation of the grid frequency value beyond the at least one threshold value is indicative of an underfrequency condition; and
adjusting an electrical output power from the wind turbine at least during the underfrequency condition, the adjusting configured to cause a step response to the electrical output power of the wind turbine from a baseline power level to a maximal power value in a direction selected to counteract the underfrequency condition;
implementing the step response by way of a singular step control function from the baseline power level to the maximal power level so that kinetic energy stored in a rotating shaft of the wind turbine is instantaneously extracted to provide the step response to the electrical output power of the wind turbine.

18. The method of claim 17, wherein the step response is effected without evaluating at least one of the following: a rate of change of the deviation, an integral of the deviation and/or a magnitude of the deviation.

19. The method of claim 17, wherein the adjusting of the output power of the wind turbine is based on an on-off control strategy, wherein the effected step response occurs during an on-state of the control strategy.

20. The method of claim 19, maintaining the on-state to reach a predefined frequency value corresponding to a normal frequency condition.

21. The method of claim 19, wherein, during an off-state of the control strategy effecting a step response to the electrical output power of the wind turbine in a direction to return to a wind turbine state corresponding to a normal frequency condition.

22. The method of claim 17, further comprising adjusting the electrical output power from the variable speed wind turbine during an overfrequency condition, the adjusting configured to effect a step response of the electrical output power of the wind turbine in a direction selected to counteract the overfrequency condition, whereby excess electrical energy generated during the overfrequency condition is converted to kinetic energy for storage by the rotating shaft in view of the effected step response to the electrical output power of the wind turbine during the overfrequency condition.

23. The method of claim 22, wherein the step response during the overfrequency condition is effected without evaluating at least one of the following: a rate of change of the deviation, an integral of the deviation and/or a magnitude of the deviation.

24. The method of claim 17, further comprising smoothing the response of the electrical output power of the wind turbine as said output power returns to a normal frequency condition.

25. A bang-bang controller stored on a non-transitory computer-readable storage medium and configured to adjust an electrical output power from a variable speed wind turbine at least during an underfrequency condition, the controller comprising:
a monitor configured to monitor a grid frequency value relative to at least a first threshold value, wherein a deviation of the grid frequency value beyond the first threshold value is indicative of the underfrequency condition; and
a control unit configured to effect a step response to the electrical output power of the wind turbine from a baseline power level to a maximal power level in a direction selected to counteract the underfrequency condition, wherein the effected step response is performed by the control unit without evaluating at least one of the following: a rate of change of the deviation, an integral of the deviation and/or a magnitude of the deviation, wherein the step response is effected by way of a singular step control function implemented by the controller from the baseline power level to the maximal power level so that kinetic energy stored in a rotating shaft of the wind turbine is instantaneously extracted to effect the step response to the electrical output power of the wind turbine.

* * * * *